(12) United States Patent
Mihcak et al.

(10) Patent No.: US 7,397,933 B2
(45) Date of Patent: Jul. 8, 2008

(54) COLLUSION RESISTANT DESYNCHRONIZATION FOR DIGITAL VIDEO FINGERPRINTING

(75) Inventors: Mehmet Kivanc Mihcak, Redmond, WA (US); Yinian Mao, Lanham, MD (US)

(73) Assignee: Microsoft Corporation, Redmond, WA (US)

( * ) Notice: Subject to any disclaimer, the term of this patent is extended or adjusted under 35 U.S.C. 154(b) by 263 days.

(21) Appl. No.: 11/139,176

(22) Filed: May 27, 2005

(65) Prior Publication Data

US 2006/0269097 A1 Nov. 30, 2006

(51) Int. Cl.
*G06K 9/00* (2006.01)
(52) U.S. Cl. .................. 382/124; 382/293; 382/295; 348/412.1; 348/423.1
(58) Field of Classification Search ............. 382/216, 382/278, 282, 293, 295; 348/412.1, 415.1, 348/423.1
See application file for complete search history.

(56) References Cited

U.S. PATENT DOCUMENTS

| | | | | |
|---|---|---|---|---|
| 5,034,981 | A | * | 7/1991 | Leonard et al. ............. 380/204 |
| 5,355,411 | A | * | 10/1994 | MacDonald ................ 713/186 |
| 5,664,018 | A | * | 9/1997 | Leighton .................... 380/54 |
| 5,930,369 | A | * | 7/1999 | Cox et al. ................... 380/54 |
| 6,091,822 | A | * | 7/2000 | Mellows et al. ............. 380/210 |
| 6,381,367 | B1 | * | 4/2002 | Ryan .......................... 382/232 |
| 6,539,475 | B1 | * | 3/2003 | Cox et al. ................... 713/100 |
| 6,671,376 | B1 | * | 12/2003 | Koto et al. .................. 380/210 |
| 6,785,401 | B2 | * | 8/2004 | Walker et al. ............... 382/100 |

OTHER PUBLICATIONS

Boneh et al., "Collusion-Secure Fingerprinting for Digital Data", IEEE Transactions on Information Theory, Sep. 1998, vol. 44, No. 5, pp. 1897-1905.

Zhao et al., "Nonlinear Collusion Attacks on Independent Fingerprints for Multimedia", Proceedings, ICASSP, 2003, vol. 5, pp. 664-667.

Thevenaz et al., "A Pyramid Approach to Subpixel Registration Based on Intensity", IEEE Transactions on Image Processing, Jan. 1998, vol. 7, No. 1, pp. 27-41.

Yacobi, "Improved Doneh-Shaw Content Fingerprinting", Topics in Cryptology, 2001, p. 378-391.

Chen, "Adaptive Temporal Interpolation Using Bidirectional Motion Estimation and Compensation", Proceedings ICIP, 2002, vol. 2, pp. 313-316.

Petitcolas, "Watermarking Scemes Evaluation: Algorithms Need Common Benchmarks", IEEE Signal Processing Magazine, Sep. 2000, vol. 17, No. 5, pp. 58-64.

Celik et al., "Collusion-Resilient Fingerprinting by Random Pre-Warping", IEEE Signal Processing Letters, Oct. 2004, vol. 11, No. 10, pp. 831-835.

Trappe et al., "Anti-collusion Fingerprinting for Multimedia", IEEE Transactions on Signal Processing, Apr. 2003, vol. 51, No. 4, pp. 1069-1087.

Baker et al., "Lucas-Kanade 20 Years On: A Unifying Framework", International Journal of Computer Vision, 2004, vol. 56, No. 3, pp. 221-255.

Wang; "Anit-Collusion Forensics of Multimedia Fingerprinting Using Orthogonal Modulation"; IEEE Transactions On Image Processing, vol. 14, No. 6, Jun. 2005; pp. 804-821.

Winder; "A Motion Compensated Frame-Rate Conversion Technique for Video Sequences"; A techniqual document; Jan. 3, 2003.

* cited by examiner

*Primary Examiner*—Yosef Kassa
(74) *Attorney, Agent, or Firm*—Lee & Hayes, PLLC

(57) ABSTRACT

Systems and methods are described that desynchronize a video to be protected, thereby creating one or more digitally fingerprinted videos. In one implementation, a video to be protected is temporally desynchronized and spatially desynchronized. A fingerprinted copy of the video, as modified by the temporal and spatial desynchronizations, is created.

20 Claims, 11 Drawing Sheets

200 ⇘

202
DERIVE AN AFFINE TRANSFORM MATRIX TO WARP FROM FRAME $F_1$ TO FRAME $F_2$ WITHIN THE VIDEO, WHEREIN THE MATRIX TAKES INTO ACCOUNT ROTATION, SCALING AND TRANSLATION OPERATIONS

↓

204
FIND A SOLUTION TO A MINIMIZATION PROBLEM ASSOCIATED WITH THE AFFINE TRANSFORM MATRIX, WHEREIN THE SOLUTION IS A PARAMETER VECTOR ASSOCIATED WITH $F_1$ AND $F_2$

↓

206
APPLY A LEAST SQUARES SOLUTION TO THE EQUATION WHEN THE EQUATION IS BASED ON A DISTANCE METRIC, DIST, WHICH IS A SUM OF THE SQUARE OF THE DIFFERENCES

↓

208
REDUCE THE COMPUTATIONAL COMPLEXITY OF THE MINIMIZATION PROBLEM BY SEPARATING TRANSLATIONAL PARAMETERS FROM OTHER PARAMETERS, SOLVING FOR THE TRANSLATIONAL PARAMETERS FIRST, AND APPLYING AN ITERATIVE PROCEDURE TO THE PARAMETER VECTOR UNTIL IT CONVERGES

*Fig. 2*

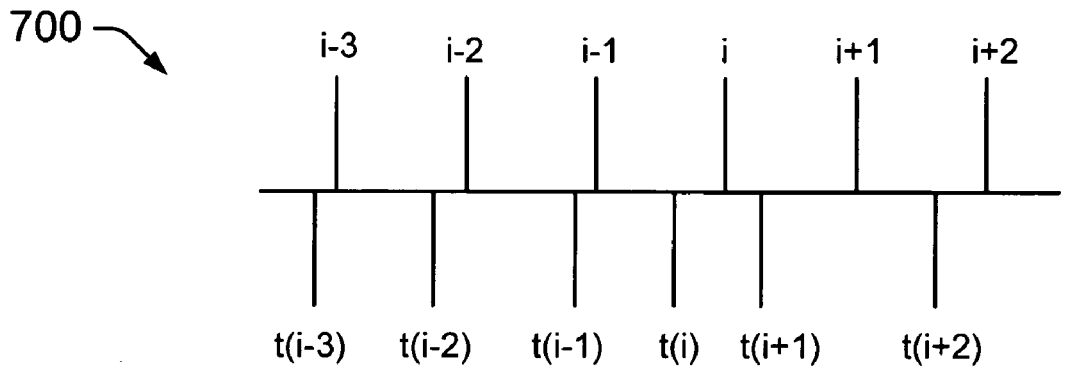

*Fig. 7*

```
900 ──┐
      ↓
┌─────────────────────────────────────┐
│            902                      │
│  DETERMINE WHICH FRAMES WITHIN      │
│  THE VIDEO DESCRIBE FAST MOTION     │
│       AND COMPLEX VIDEO             │
└─────────────────────────────────────┘
                  │
                  ↓
┌─────────────────────────────────────┐
│            904                      │
│   SKIP APPLICATION OF PSEUDO-       │
│  RANDOM SAMPLING TO THE FRAMES,     │
│          AS DETERMINED              │
└─────────────────────────────────────┘
```

*Fig. 9*

COLLUSION RESISTANT DESYNCHRONIZATION FOR DIGITAL VIDEO FINGERPRINTING

BACKGROUND

The proliferation of digital multimedia, along with the ever-increasing bandwidth in internet communications, has made the management of digital copyright more and more challenging. Since any end user receiving a copy of multimedia content can redistribute the copy to other users, a mechanism to trace the illegal distributor needs to be established to protect the digital copyright. Multimedia fingerprinting is a way to embed unique IDs into each user's multimedia content. Because the embedded fingerprint is uniquely associated with the user to whom the copy was given, extraction of that fingerprint in a pirated copy uniquely identifies the user associated with the fingerprint.

Since multimedia data can be slightly modified without causing perceptual distortion, a fingerprint may be embedded within the data without degrading the end user's experience. There have been a number of prior works on fingerprinting image and audio signal. However, the research into video fingerprinting has been quite limited. Usually, as the host signal for fingerprinting changes, the fingerprinting scheme also needs to be adapted. For example, in a color image of natural scenes, the space for fingerprint embedding is usually much larger than in a binary image. Naturally, we would expect more embedding capacity from video. However, the large volume of data in video introduces both favorable and unfavorable aspects. A favorable aspect is that the embedding capacity of video is much higher than still images, and therefore the robustness of fingerprinting is increased. An unfavorable aspect is that the spatial and temporal redundancy of video signals may be exploited by attackers. Therefore, the design and engineering of video fingerprinting schemes is more sophisticated than fingerprinting still images and audio.

While the fingerprint designer's effort to protect digital copyright, the attackers also have strong incentive to remove the fingerprint. For example, popular marketing schemes send popular motion pictures to theaters prior to a period of time during which they are sold "on video," e.g. on a DVD medium. If a pirate can sell the movie on DVD during its theater run, a huge profit can be realized. In attacking a fingerprinting scheme, the attackers' goal is to fool the fingerprint detector so that it will not be able to detect or correctly identify a finger print. For attackers, time complexity and perceptual quality are also important considerations, since the value of multimedia lies in part in its timeliness and perceptual quality. Accordingly, a group of attackers, each in possession of a fingerprinted copy of a video may conspire to form a collusion attack. Such an attack attempts to attenuate or remove the fingerprint embedded in each copy. When the number of fingerprinted copies within the collusion attack is large enough, e.g. 30 to 40 colluders, the utility of the fingerprint is reduced so much that it may not be possible for the fingerprint detector to detect the existence of fingerprint in the colluded copy.

SUMMARY

Collusion resistant desynchronization for use in digital video fingerprinting is described, such that a video to be protected is desynchronized, thereby creating one or more digitally fingerprinted videos. In one implementation, a video to be protected is temporally desynchronized and spatially desynchronized. A fingerprinted copy of the video, as modified by the temporal and spatial desynchronizations, is created.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

FIG. 2 illustrates exemplary aspects of temporal desynchronization, including affine warping strategies, wherein frame $F_1$ is warped toward frame $F_2$.

FIG. 7 illustrates exemplary aspects of pseudo-random time indices for temporal re-sampling.

FIG. 9 illustrates exemplary aspects of temporal desynchronization, including interpolation-skipping strategies.

DETAILED DESCRIPTION

The following discussion is directed to systems and methods that combat the collusion attacks, wherein two or more recipients of fingerprinted copies of multimedia content (e.g. a DVD with audio video content, such as a movie) attempt to combine their copies to create a high quality version without fingerprints. In particular, the systems and methods are designed to result in generation of perceptual artifacts if the fingerprinted copies are recombined.

Figure 1:
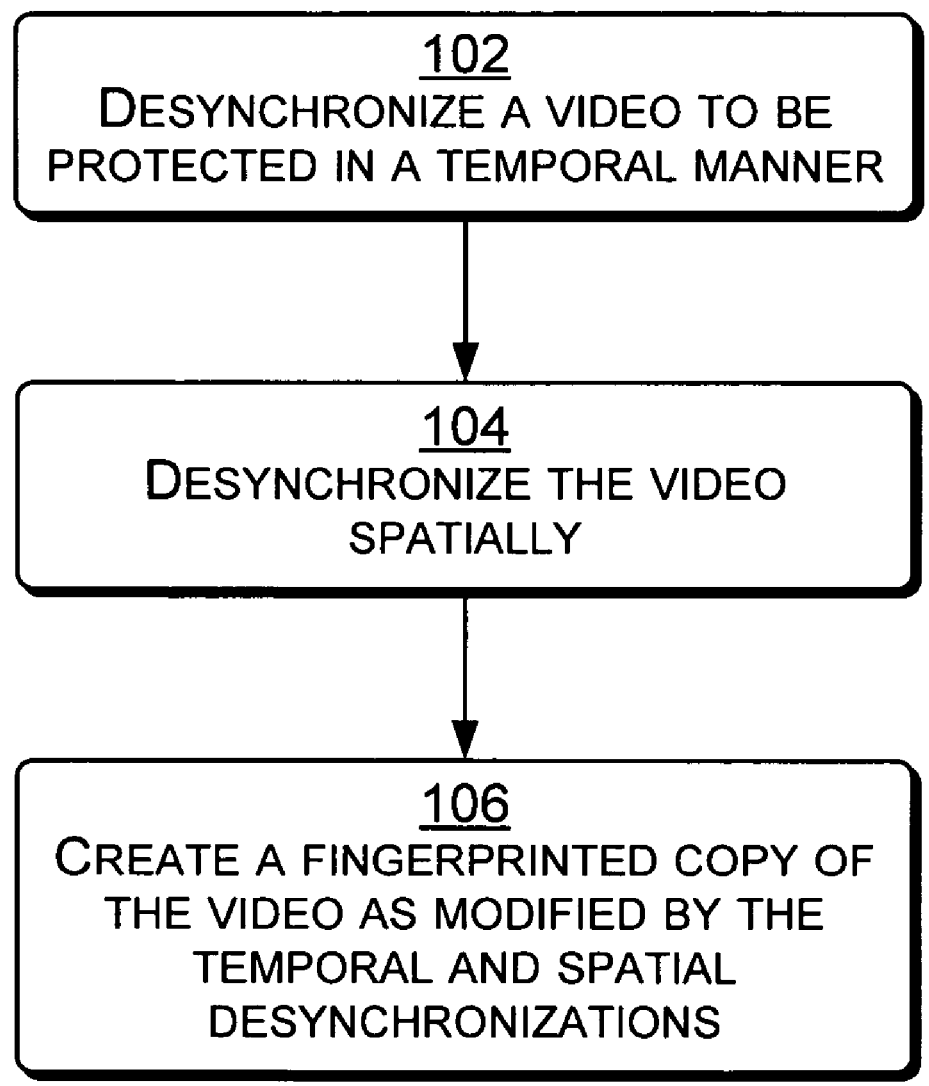
FIG. 1 illustrates an exemplary time line allowing uniformly sampled time indices to be compared to randomly sampled time indices.

FIG. 1 shows an exemplary desynchronization technique 100 used to fingerprint multimedia content to counter collusion attacks. In the embodiment of FIG. 1, a collusion-resistant de-synchronization scheme includes video de-synchronization in both temporal and spatial domains. Each user's copy of video is slightly changed in such a way that the changes will not be noticeable for each individual copy, but will be significant enough to produce perceptual artifacts when multiple copies are combined (e.g. by such methods as averaging). Since the physical characteristics of the temporal axis and spatial axis differ significantly, the temporal and the spatial de-synchronization are typically separated into two steps. In a first step, constrained pseudo-random sampling is first applied in the temporal domain. Given a set of video frames uniformly sampled along the time axis, a motion-based frame interpolation is employed to generate new video frames at arbitrary time indices. In a second step, each video frame is further de-synchronized by a global geometrical operation involving rotation, scaling and translation, followed by a local random bending using a randomized spatial sampling grid. Issues of perceptual quality are addressed by smoothing the de-synchronization parameters along spatial and temporal axes. In addition, the issue of de-synchronization security is analyzed in terms of computational complexity.

In particular, FIG. 1 shows an example 100 of an embodiment wherein pseudo-random temporal sampling of video and spatial desynchronization techniques are combined to produce fingerprinted copies of a video that can be traced back to an original recipient, and when combined with similar fingerprinted copies result in a flawed copy marred by visible artifacts. At block 102, a video to be protected is temporally desynchronized. At block 104, the video is spatially desynchronized. At block 106, a fingerprinted copy of the video is created, as modified by the temporal and spatial desynchronizations.

Pseudo-Random Temporal Sampling of Video

This section expands on temporal desynchronization, a topic introduced by block 102 of FIG. 1. Temporal desynchronization can utilize pseudo-random temporal sampling, involving video frame interpolation. The basic problem associated with video frame interpolation is that given a pair of video frames close in time (e.g. $F_1$ at time $t_1$ and $F_2$ at time $t_2$, wherein $(t_2 > t_1)$ and $T = t_2 - t_1$ is the frame period of the source video) we want to generate an intermediate frame at time $(t_1 + \Delta \cdot T)$, where $0 \leq \Delta \leq 1$. In many cases, direct averaging the corresponding frame pixels will not give a good result, because the objects in video frames tend to move and such motion should be taken into account when the interpolation is conducted. Accordingly, there is a need for more sophisticated techniques.

Temporal desynchronization may utilize pseudo-random temporal sampling. Pseudo-random temporal sampling of video may utilize an affine warping strategy to provide the basis for video frame interpolation. For example, given two video frames $F_1$ and $F_2$ it is advantageous to warp $F_1$ toward $F_2$. The coordinates in $F_1$ may be denoted by $(x_1, y_1)$ and that in $F_2$ by $(x_2, y_2)$. Homogeneous coordinates can be used to describe the 2-D affine warping from $F_1$ to $F_2$, according to:

$$\begin{pmatrix} x \\ y \\ 1 \end{pmatrix} = \begin{pmatrix} w1 & w2 & w3 \\ w4 & w5 & w6 \\ 0 & 0 & 1 \end{pmatrix} \begin{pmatrix} x1 \\ y1 \\ 1 \end{pmatrix}. \quad (1)$$

The affine transform matrix is denoted in the above equation by W. The parameters $w_1$ through $w_6$ take into account of rotation, scaling and translation operations. All these parameters are first estimated on the down-sampled images from $F_1$ and $F_2$, then up-scaled and refined for larger size images, until finally reaching the original frame size.

Parameter searching involves finding a solution to a minimization problem. Denote the warping operation of a frame by $warp_w(\bullet)$, and a distance metric that measures the distance between two frames by $dist(\bullet, \bullet)$. Since a warping operation is uniquely determined by the warping parameters, we try to find the parameter vector $w^* = [w_1^* w_2^* w_3^* w_4^* w_5^* w_6^*]^T$ such that $$w^* = \min_w dist(warp_w(F_1), F_2). \quad (2)$$

When the distance metric is the sum of the square of the differences, the above formula becomes a least squares problem. Such a problem can be solved by the classic Lucas-Kanade algorithm, which essentially uses Gauss-Newton method to find the minima.

To reduce the computation complexity due to the high dimensionality, notice that the translational parameters, $w_3$ and $w_6$, are separable from other parameters. Therefore, $w_3$ and $w_6$ may be determined first, followed by an iterative procedure to update the parameter vector until it converges.

Accordingly, the affine warping solution may be applied by deriving an equation describing an affine warping from frame $F_1$ to frame $F_2$ within the video, such as equation (1). Having derived the equation, a parameter vector describing the warping may be found by solving a minimization problem derived from the equation, such as equation (2).

FIG. 2 shows an embodiment 200 of temporal desynchronization characterized by an affine warping solution wherein $F_1$ is warped toward $F_2$. The affine warping solution is found within a set of warping functions $\Phi$ such that for any given image I, a warped image I' may be generated by applying a warping function $\phi_k(\bullet) \in \Phi$ to image I, obtaining $I' = \phi_k(I)$, for distribution to a user k. Each user will therefore receive a different copy of the image I, thereby complicating a collusion attack. At block 202, an affine transform matrix is derived to warp from frame $F_1$ to frame $F_2$ within the video, wherein the matrix takes into account rotation, scaling and translation (RST) operations. Equation (1) is representative of the affine transform matrix. At block 204, a solution is found to a minimization problem associated with the matrix. Equation (2) is representative of the minimization problem. The minimization problem may be attacked in any appropriate manner. For example, at block 206 a least squares solution is applied, where the equation is based on a distance metric, dist, which is a sum of the square of the differences. At block 208, the computational complexity of the minimization problem may be reduced by separating translational parameters from other parameters, solving for the translational parameters first, and applying an iterative procedure to the parameter vector until it converges. Thus, in the example above, parameters $w_1$ and $w_6$ were determined first, thereby reducing the dimensionality of the problem to facilitate the solution to the remaining parameters.

The above discussion of FIG. 2 relates to video frame interpolation generally, and more particularly to an affine warping tool for pseudo-random temporal sampling. Under these circumstances, we have seen that given two video frames $F_1$ and $F_2$ it is advantageous to warp $F_1$ toward $F_2$. An alternative affine warping tool presented by FIG. 3 and adapted for a similar application, it may be advantageous to warp both warp $F_1$ and $F_2$.

Suppose we are given frame $F_1$ at time $t_1$ and $F_2$ at time $t_2$ and we want to warp both frame $F_1$ and $F_2$ toward time instance $(t_1+\Delta \cdot T)$, where $0 \leq \Delta \leq 1$. We first estimate the warping matrix W from $F_1$ to $F_2$. Then the forward and backward affine transform matrices $W_F$ and $W_B$, which warp $F_1$ and $F_2$ toward time $(t_1+\Delta \cdot T)$, can be computed according to $$W_F = \begin{pmatrix} \Delta & 0 & 0 \\ 0 & \Delta & 0 \\ 0 & 0 & 1 \end{pmatrix} W + \begin{pmatrix} 1-\Delta & 0 & 0 \\ 0 & 1-\Delta & 0 \\ 0 & 0 & 0 \end{pmatrix} \quad (3)$$

and $$W_B = \begin{pmatrix} 1-\Delta & 0 & 0 \\ 0 & 1-\Delta & 0 \\ 0 & 0 & 1 \end{pmatrix} W + \begin{pmatrix} \Delta & 0 & 0 \\ 0 & \Delta & 0 \\ 0 & 0 & 0 \end{pmatrix} \quad (4)$$

The forward and backward warped frames, $F_{fwd}$ from $F_1$ and $F_{bwd}$ from $F_2$ are obtained by re-sampling $F_1$ and $F_2$ respectively at the warped coordinates $$F_{fwd} = \text{resample}(F_1(W_F[x\ y\ 1]^T)), \text{ and} \quad (5)$$

$$F_{bwd} = \text{resample}(F_2(W_B[x\ y\ 1]^T)). \quad (6)$$

Since the re-sampling point may not be at integer coordinates, interpolation methods, such as bilinear interpolation or cubic interpolation may be used to produce the output value.

Figures 3, 4:
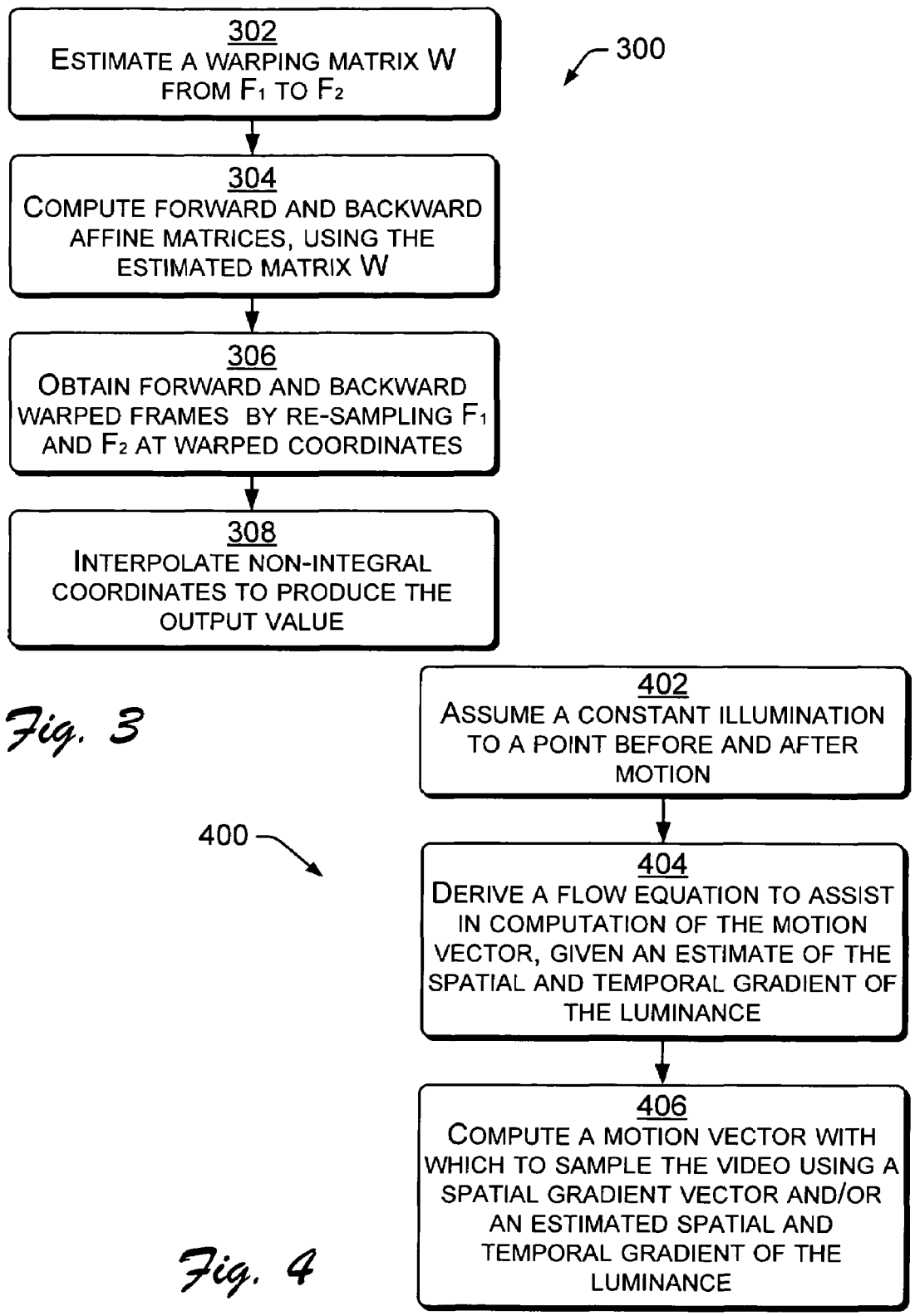
FIG. 3 illustrates exemplary aspects of temporal desynchronization, including affine warping strategies, wherein frames $F_1$ and $F_2$ are both warped.
FIG. 4 illustrates exemplary aspects of temporal desynchronization, including optical flow strategies.

FIG. 3 shows an embodiment 300 of temporal desynchronization characterized by a second affine warping solution, wherein both $F_1$ and $F_2$ are warped toward a time instance $(t_1+\Delta \cdot T)$, where $0 \leq \Delta \leq 1$. The second affine warping solution is also found within a set of warping functions $\Phi$ such that for any given image I, a warped image I' may be generated by applying a warping function $\phi_k(\bullet) \in \Phi$ to image I, obtaining $I'=\phi_k(I)$, for distribution to a user k. Each user will therefore receive a different copy of the image I, thereby complicating a collusion attack. At block 302, a warping matrix W from $F_1$ to $F_2$ is estimated. At block 304, forward and backward affine matrices may be computed, using the estimated matrix W. Equations (3) and (4) above are examples of the forward and backward matrices. The forward and backward matrices allow calculation of forward and backward warped frames. Accordingly, at block 306 forward and backward warped frames are obtained by re-sampling $F_1$ and $F_2$ at warped coordinates. In the example above, equations (5) and (6) show how forward and backward frames, $F_{fwd}$ and $F_{bwd}$, can be obtained by resampling and use of the forward and backward matrices. At block 308, where non-integral coordinates are produced, interpolation may be used to produce acceptable output values.

Embodiments of pseudo-random temporal sampling of video may utilize an optical flow strategy to provide the basis for video frame interpolation. Accordingly, optical flow may provide the pseudo-random temporal sampling of video that is used to apply a fingerprint to the video derived from a video to be protected. Optical flow refers to observed two-dimensional motion in video data. Since human eyes perceive motion by observing corresponding points at different locations at different times, the identification of a motion is based on the constant intensity assumption that the luminance value of the same object point does not change after motion. Consider that in a video sequence the luminance variation is denoted by $f(x, y, t)$. Suppose an object point P at spatial location $(x, y)$ and time t moves to $(x+dx, y+dy)$ at time $t+dt$. Under the constant intensity assumption, we have $$f(x+dx, y+dy, t+dt) = f(x, y, t). \quad (7)$$

Assuming the continuity of the luminance field along the spatial and temporal axis, we can apply Taylor expansion to the left hand side of (7), so the equation now becomes $$f(x, y, t) + \frac{\partial f}{\partial x} dx + \frac{\partial f}{\partial y} dy + \frac{\partial f}{\partial t} dt = f(x, y, t) \quad (8)$$

Then we arrive at the optical flow equation $$\frac{\partial f}{\partial x} v_x + \frac{\partial f}{\partial y} v_y + \frac{\partial f}{\partial t} = 0 \quad (9)$$

or $$(\nabla f)^T \vec{v} + \frac{\partial f}{\partial t} = 0 \quad (10)$$

where $(\nabla f)$ is the spatial gradient vector of $f(x, y, t)$.

The optical flow equation offers us an approach to compute the motion vector if we can estimate the spatial and temporal gradient of the luminance. In on embodiment, the spatial gradients for location $(x, y)$ are estimated within a 5×5 window centered at $(x, y)$. Accordingly, the function of equation (10) may be augmented to compute the x and y components of the motion vector.

FIG. 4 shows an embodiment 400 of temporal desynchronization characterized by a applying an optical flow solution to the re-sampling. In particular, a spatial gradient vector is used to alter frames within the video, thereby warping the video differently for each user to whom copies of the video will be distributed. At block 402, assume a constant illumination f to a point $(x, y)$ before and after motion. Such an assumption is consistent with the natural tracking performed by the human eye, wherein motion is most readily observed when the object has a generally consistent appearance. At block 404, a flow equation is derived. For example, the equations (9) and (10) are representative of optical flow equations that assist in computation of the motion vector, given an estimate of the spatial and temporal gradient of the luminance. At block 406, a motion vector is computed with which to sample the video using $\nabla f$ and an estimated spatial and temporal gradient of the luminance.

Embodiments of pseudo-random temporal sampling of video may utilize a motion vector switching strategy to provide the basis for video frame interpolation. Motion vector switching assists in selecting a motion vector to correct warping implied by W. Suppose we are given frame $F_1$ at time $t_1$ and $F_2$ at time $t_2$ $(t_2 > t_1)$ and want to generate a new frame at time $(t_1+\Delta \cdot T)$. We first generate three pairs of warped frames. The first pair is just the input frames $(F_1, F_2)$. The second pair is the input frames affine warped towards time instance $(t_1+\Delta \cdot T)$, $(F_{fwd}, F_{bwd})$. The third pair is the affine warped frames plus a correction motion compensation, $(F'_{fwd}, F'_{bwd})$, where the motion field is inherited from the previous down-sampled level. For each pair of the frames, differential motion estimation is applied using the optical flow approach. This results in three motion vector fields. Suppose the motion vector fields are $v_1(x, y)$, $v_2(x, y)$, and $v_3(x, y)$. Motion vector switching is a process to determine a preferred motion vector from three candidate motion vectors at location $(x, y)$ that is a correction to the affine warping implied by W. The decision criterion is based on the following error function $E_v(x, y)$, which can be seen as a practical form of the optical flow equation (10)

$$E_{\vec{v}}(x, y) = \sum_{(x,y) \in S} \left( \vec{v}(x, y) \cdot \begin{pmatrix} \nabla f_x \\ \nabla f_y \end{pmatrix} + \nabla f_t \right)^2, \text{ where} \quad (11)$$

$$\nabla f_x = \frac{\partial f}{\partial x}, \nabla f_y = \frac{\partial f}{\partial y}, \nabla f_t = \frac{\partial f}{\partial t},$$

and S is a small 5×5 pixel window centered at (x, y). The motion vector v(x, y) is constant over the summation and $\nabla f_x$, $\nabla f_y$, and $\nabla f_t$, are functions of (x, y). Such a formulation can be solved by the classic Lucas-Kanade algorithm, which is essentially a Gauss-Newton method to iteratively solve a given numerical optimization problem. Using the above error function, the candidate motion vector that achieves the minimum error at location (x, y) is chosen as the new motion vector. For interpolation application, we enforce smoothness on the motion vector by applying a smooth filtering on the motion vector field using median or averaging filter. This yields the final motion vector field v.

Figures 5, 6:
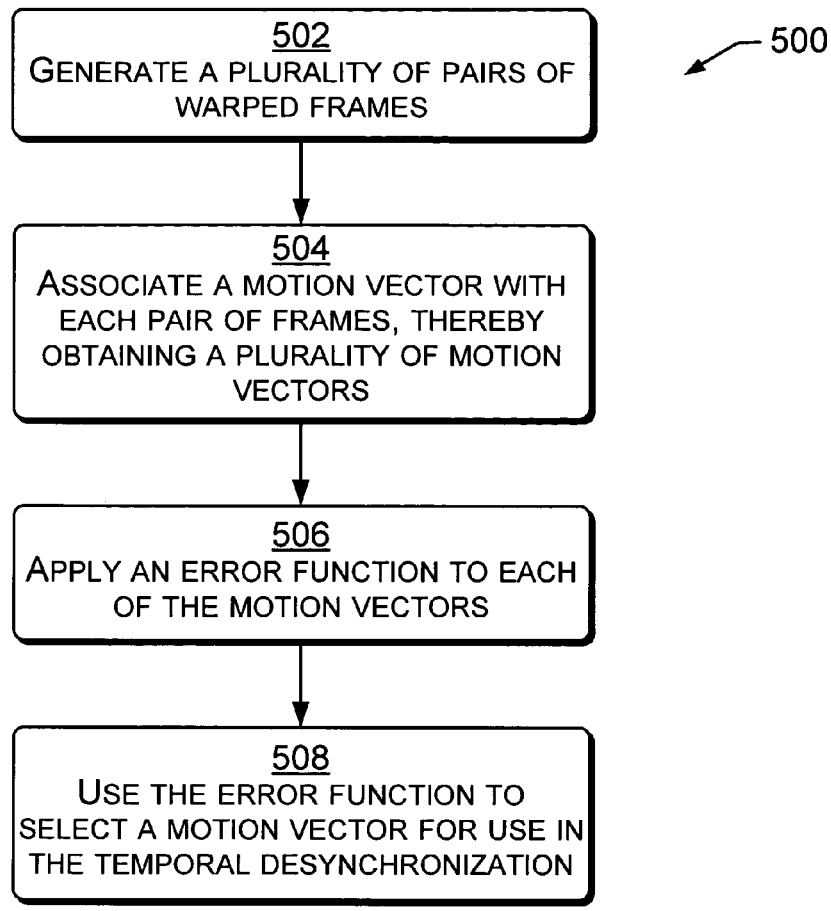
FIG. 5 illustrates exemplary aspects of temporal desynchronization, including motion vector switching strategies.
FIG. 6 illustrates exemplary aspects of temporal desynchronization, including motion compensated temporal interpolation strategies.

FIG. 5 shows an embodiment 500 of temporal desynchronization characterized by applying a motion vector switching solution to the re-sampling. At block 502, a plurality of pairs of warped frames is generated. At block 504, a motion vector is associated with each pair of frames, thereby obtaining a plurality of motion vectors. At block 506, an error function is applied to each of the motion vectors. The error function may be in the form of equation (11). At block 508, the error function is used to select a motion vector for use in the temporal desynchronization.

Embodiments of pseudo-random temporal sampling of video may utilize a motion compensated temporal interpolation strategy to provide the basis for video frame interpolation. In a motion compensated temporal interpolation strategy, input frames may be warped toward a time instance. For example, based on the motion field v, the input frames $F_1$ and $F_2$ are warped toward the time instance $(t_1 + \Delta \cdot T)$ to generate two warped frames $G_1$ and $G_2$. For this purpose, the motion vectors are linearly scaled and the warped frame is the re-sampled version from the source frame. For example $$G_1 = \text{resample}(F_1(x + \Delta v_x, y + \Delta v_y)), \quad (12)$$

and frame $G_2$ can be obtained in a similar way. Once we get $G_1$ and $G_2$, the final interpolation frame F(x, y) is obtained as $$F(x, y) = (1-\Delta) \cdot G_1(x, y) + \Delta \cdot G_2(x, y). \quad (13)$$

Accordingly, video may be temporally desynchronized by applying a motion compensated temporal interpolation solution to the re-sampling. $G_1$ and $G_2$ may be generated by warping $F_1$ and $F_2$ toward a time instance, such as $(t_1+\Delta \cdot T)$. $G_1$ and $G_2$ may then be re-sampled according as a function of $F_1$ and $F_2$, such as equation (12). Finally, the interpolated frame F may be obtained as a function of $G_1$ and $G_2$, such as by using equation (13).

FIG. 6 shows an embodiment 600 of temporal desynchronization characterized by applying a motion compensated temporal interpolation solution to the re-sampling, wherein input frames $F_1$ and $F_2$ and an associated motion vector v are used to derive an interpolated frame F, such that sampling of F results in a fingerprinted sampling. At block 602, frames $G_1$ and $G_2$ are generated by warping frames $F_1$ and $F_1$ toward a time instance $(t_1+\Delta \cdot T)$. For example, equation (12) shows how frame $G_1$ may be obtained from frame $F_1$. At block 604, frames $G_1$ and $G_2$ are re-sampled from frames $F_1$ and $F_2$. For example, the re-sampling may be performed according to equation (12). At block 606, an interpolated frame may be obtained as a function of the warped frames $G_1$ and $G_2$. For example, equation (13) is an example of how the interpolated frame F may be obtained from the warped frames $G_1$ and $G_2$.

Embodiments of pseudo-random temporal sampling of video may utilize a constrained random temporal re-sampling strategy to provide the basis for video frame interpolation. In one embodiment, pseudo-random time indices are generated along temporal axis, allowing re-sampling of the video at the newly generated time instances by means of frame interpolation. To achieve a good perceptual quality, we put the constraint that there must be at least one frame in the re-sampled video between two frame intervals in the original video, i.e., between any frame i and i+2 in the original video. Referring to FIG. 7, it can be seen that a randomly sampled time index is located between each of the uniformly sampled time indices. Such a constraint limits the temporal jittering in the re-sampled video, at the same time allows room for temporal randomization. To achieve this goal, we first generate i.i.d. (independent identically distributed) random time increments, $\Delta_i$, which is uniformly distributed in the range of $[1-\delta, 1+\delta]$. We then initialize t(0)=0 and compute the time index $t(i)=t(i-1)+\Delta_i$ for i=1, 2, ..., N. Here N is the total length of the re-sampled video, which is a random value according to N~Uniform[M(1−α), M(1+α)], where M is the total number of frames in the original video. Finally, we scale the values of t(1) to t(N) to make sure that all the time indices fall in the range of [0, M].

Two parameters can be chosen in this setup, δ that controls the amount of temporal jittering and α that controls the length variation. In an example by which temporal desynchronization may be implemented, δ and α may be selected as δ=0.75 and α=0.0035. Other values may give satisfactory results in various applications of these concepts.

Figure 8:
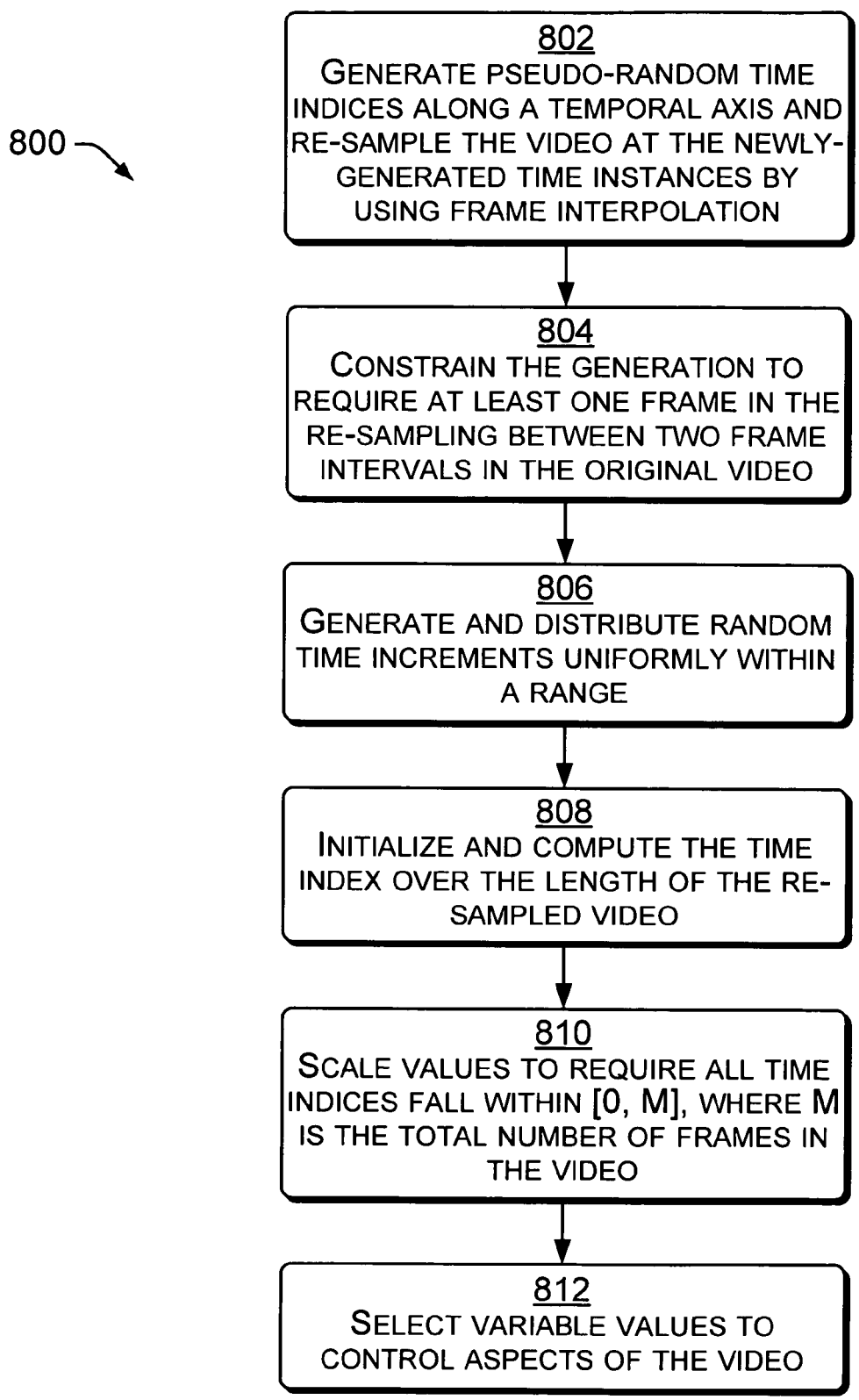
FIG. 8 illustrates exemplary aspects of temporal desynchronization, including constrained random temporal re-sampling strategies.

FIG. 8 shows an embodiment 800 of temporal desynchronization characterized by applying a constrained random temporal re-sampling strategy to the re-sampling, wherein uniformly sampled time indices associated with the video are replaced by randomly sampled time indices associated with the re-sampling. At block 802, pseudo-random time indices are generated along a temporal axis. The video is then re-sampled at the newly-generated time instances, such as by using frame interpolation. At block 804, the generation of pseudo-randomly sampled time indices is constrained to require at least one frame in the re-sampling between two frame intervals in the original video. In the example of FIG. 7, it can be seen that between every two of the original frame markers (seen on top of the time line) there is one pseudo-random frame marker (seen on the bottom of the time line). At block 806, random time increments $\Delta_i$ are generated and uniformly distributed within a range $[1-\delta, 1+\delta]$. At block 808, the time index is initialized and computed over the length of the video. For example, the time index may be initialized at t(0)=0, and time index computed according to $t(i)=t(i-1)+\Delta_i$ for i=1, 2, ..., N, where N is the re-sampled video's length and is random according to N~Uniform[M(1−α), M(1+α)]. At block 810, the values t(1) to t(N) are scaled to require all time indices fall within [0, M], where M is the total number of frames in the video. At block 812, variables may be selected to control aspects of the video. In particular, α is chosen to control length of variation and δ to control temporal jittering. For example, δ may be set at 0.75 and α may be set at 0.0035.

Embodiments of pseudo-random temporal sampling of video may utilize an interpolation skipping strategy to enhance quality control. When frames collectively constitute fast motion and/or complex scenes, use of frame interpolation may not result in a satisfactory perceptual result. Therefore, the quality of the interpolated frame may be controlled by skipping the frames that represent fast and complex motion. Quantitatively, the variance of the motion vector field may be computed as var($v_x$) and var($v_y$), wherein interpolation is skipped whenever the sum var($v_x$)+var($v_y$) is greater than a threshold value $V_{th}$. In one implementation, the frame size may be set to 640×480 pixels and $V_{th}$ may be set at 300. In general, use of a smaller frame size should result in proportional reduction of the threshold, based on the width or height of the frame.

FIG. 9 shows an embodiment 900 of an interpolation skipping strategy to enhance quality control. At block 902, it is determined which frames within the video describe fast motion and complex video. These frames represent a potential quality issue if pseudo-random temporal sampling is applied. At block 904, the frames determined to describe fast motion and complex video are noted, and re-sampling of these frames is skipped.

Spatial Desynchronization of Video

This section discusses spatial desynchronization, a topic introduced by block 104 of FIG. 1. Spatial desynchronization may be used in conjunction with pseudo-random temporal sampling of video to create desynchronization. One implementation of spatial desynchronization includes both global operations and local operations. The global operations include frame rotation, scaling, and translation (RST). The local operations include smooth-varying random bending and luminance filtering. In order to achieve good perceptual quality, the parameters for these operations are generated to be both spatially and temporally smooth.

RST operations are one form of spatial desynchronization. Rotation, scaling and translation (shifting) can be represented using a homogeneous coordinate. Suppose the coordinates before RST operations is ($x_1$, $y_1$), those after RST ($x_2$, $y_2$), a rotation of θ degrees will lead to the following relation $$\begin{pmatrix} x_2 \\ y_2 \\ 1 \end{pmatrix} = \begin{pmatrix} \cos\theta & \sin\theta & 0 \\ -\sin\theta & \cos\theta & 0 \\ 0 & 0 & 1 \end{pmatrix} \begin{pmatrix} x_1 \\ y_1 \\ 1 \end{pmatrix}. \quad (14)$$

Similarly we can find the relation of coordinates after translation of ($t_x$, $t_y$)

$$\begin{pmatrix} x_2 \\ y_2 \\ 1 \end{pmatrix} = \begin{pmatrix} 1 & 0 & t_x \\ 0 & 1 & t_y \\ 0 & 0 & 1 \end{pmatrix} \begin{pmatrix} x_1 \\ y_1 \\ 1 \end{pmatrix}, \quad (15)$$

and the relation after scaling $$\begin{pmatrix} x_2 \\ y_2 \\ 1 \end{pmatrix} = \begin{pmatrix} s_x & 0 & 0 \\ 0 & s_y & 0 \\ 0 & 0 & 1 \end{pmatrix} \begin{pmatrix} x_1 \\ y_1 \\ 1 \end{pmatrix}. \quad (16)$$

The overall effect can be represented using a combination of rotation, translation, and scaling transform matrices.

In the implementation of equations 14-16, the rotation angle θ, scaling factor $s_x$, and $s_y$, and translation amount $t_x$, and $t_y$, are chosen to be bounded so as to achieve imperceptibility of the RST operations. Selections consistent with this include: θ∈[−Θ,Θ)]; $s_x,s_y$∈[1−S,1+S]; and $t_y$∈[−Γ,Γ]. In this implementation, the cubic spline interpolation is used and the period is chosen as T=32. In one implementation, the RST parameter ranges are set as Θ=π/100, S=0.04, and Γ being 1% of the frame dimension.

Figure 10:
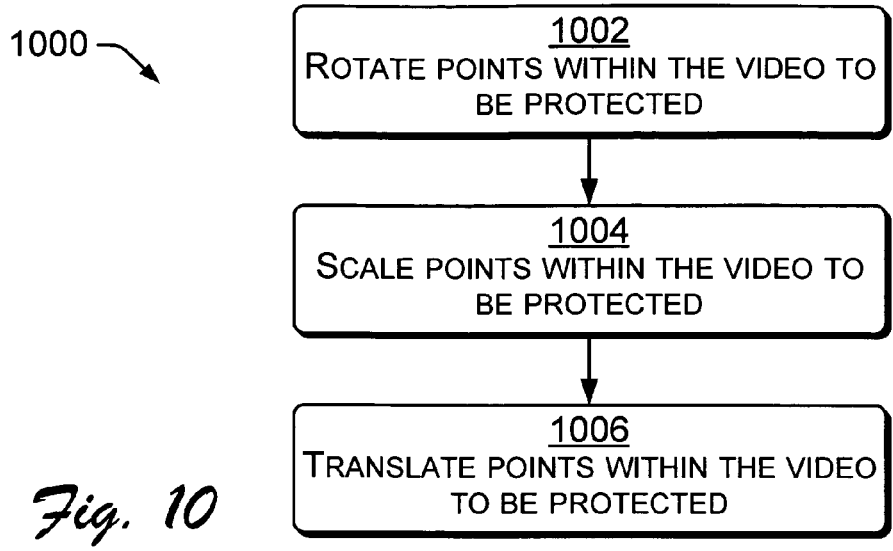
FIG. 10 illustrates exemplary aspects of spatial desynchronization, including rotation, scaling and translation (RST) strategies.

FIG. 10 shows an embodiment 1000 of spatial desynchronization characterized by applying a strategy including typically global operations for frame rotation, scaling, and translation (RST). At block 1002, points within the video to be protected are rotated. At block 1004, points within the video to be protected are scaled. At block 1006, points within the video to be protected are translated. Note that one, two, or all RST operations may be applied, as desired. These operations provide randomness, and constitute part of the fingerprint applied to the video.

Figure 11:
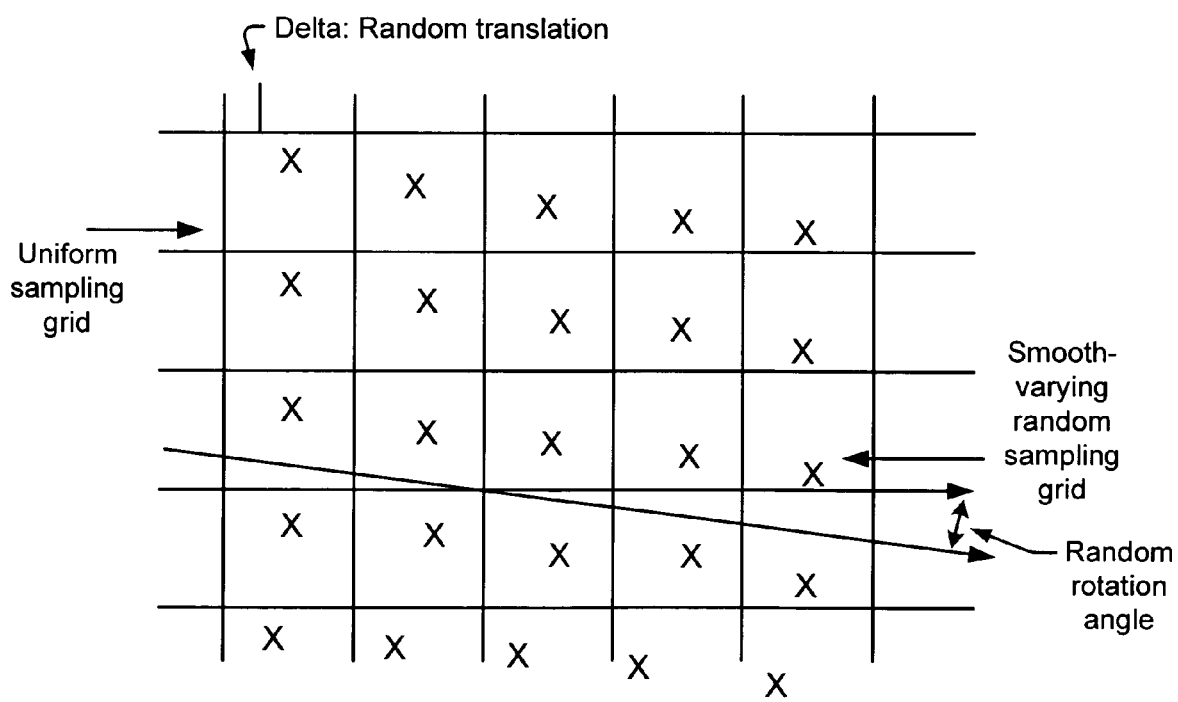
FIG. 11 illustrates exemplary aspects of spatial desynchronization.

Random bending is a tool used for the spatial re-sampling of an image at randomized sub-pixel locations. Usually in digital images, pixels are sampled at a uniform grid, as show in FIG. 11. In random bending, the original sampling grid is replaced by a pseudo-random sampling grid generated using a key. The number of sampling points is preserved before and after the bending. To preserve perceptual quality, several constraints need to be satisfied. The first is to preserve the ordering of sampling locations, i.e., if two sampling locations, ($x_i$, $y_k$.) and ($x_j$, $y_k$.) are on the same "row", with i<j, then $x_i$<$x_j$. The same rule applies to the column ordering. The second is to make sure that most regions are approximately evenly sampled. Mathematically, this is to say for any convex region S with area larger than A, there must exist at least one sampling point P inside S. We choose a spatially perturbed sampling grid as the bending grid. For each original sampling location (x, y), we generate a perturbation vector (A, $A_y$) and the new sampling locations (x', y') is $$x'=x+\Delta_x, \quad (17a)$$

and $$y'=x+\Delta_y. \quad (17b)$$

The perturbation vectors ($\Delta_x$(i, j), $\Delta_y$(i, j)) for all sampling locations form a field. To ensure that the perturbation vector field is spatially smooth-varying, we propose to obtain i.i.d. perturbation vectors periodically and interpolate the vector field in unfilled locations. This is achieved by the following two steps:

Generate perturbation vectors ($\Delta_x$(kT, rT), $\Delta_y$(kT, rT)) for k=0, 1, 2 . . . , r=0, 1, 2, . . . , and some period T.

Interpolate the perturbation vector values on the 2-D field, using bilinear or bi-cubic interpolation. First row interpolation is applied and then column interpolation is applied.

Figure 12:
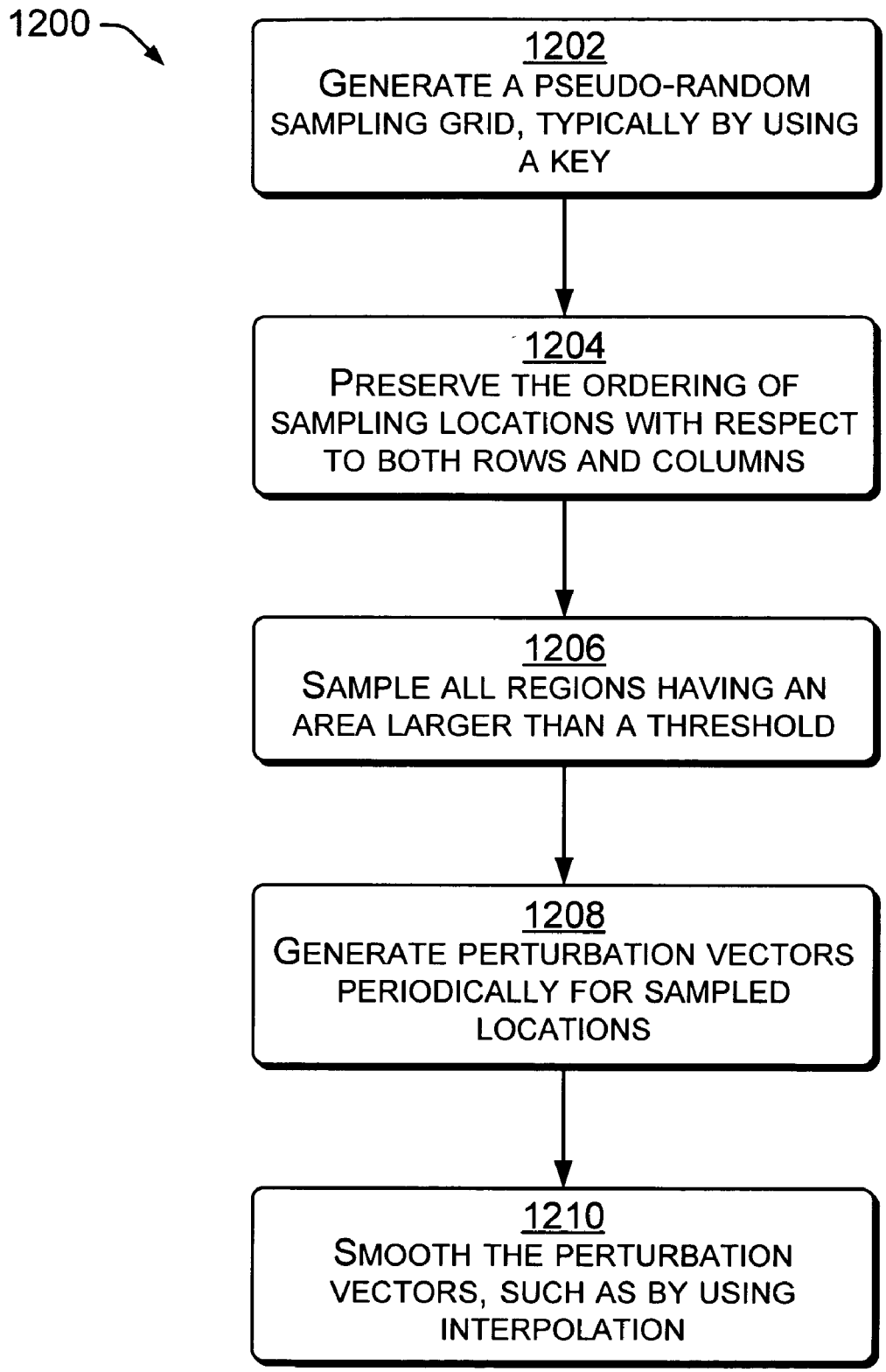
FIG. 12 illustrates exemplary aspects of spatial desynchronization, including random bending strategies.

FIG. 12 shows an embodiment 1200 of spatial desynchronization characterized by random bending operations. At block 1202, a pseudo-random sampling grid is generated, typically using a key. At block 1204, the ordering of sampling locations is preserved, with respect to both rows and columns. At block 1206, all regions having an area larger than a threshold are sampled. At block 1208, perturbation vectors are generated periodically for sampled locations. At block 1210, the perturbation vectors are smoothed, typically by a technique such as interpolation.

Luminance filtering is a tool used to randomly sharpen or smooth different area within a video. Luminance filtering has two effects. First, after temporal interpolation, spatial RST and bending operations, the generated images tend to be blurred. Thus, we can use edge-sharpening filter to enhance the perceptual quality of the final output. Second, the parameters of the luminance filters can be made random, providing more randomness in the desynchronized video. In an embodiment featuring a desynchronization system, consider a symmetric 3-by-3 luminance filter of the form $$\begin{pmatrix} -B/8 & -B/8 & -B/8 \\ -B/8 & A+B & -B/8 \\ -B/8 & -B/8 & -B/8 \end{pmatrix} \quad (17C)$$

Here the parameter A controls the total energy of the filter and parameter B accounts for the sharpening effect. For good perceptual quality, A should be close to 1 and B should be larger than 0 in order to achieve edge sharpening effect. In an example implementation, A is in the range [1−0.04,1+0.04] and B is in the range [0, 0.7].

Figures 13, 14:
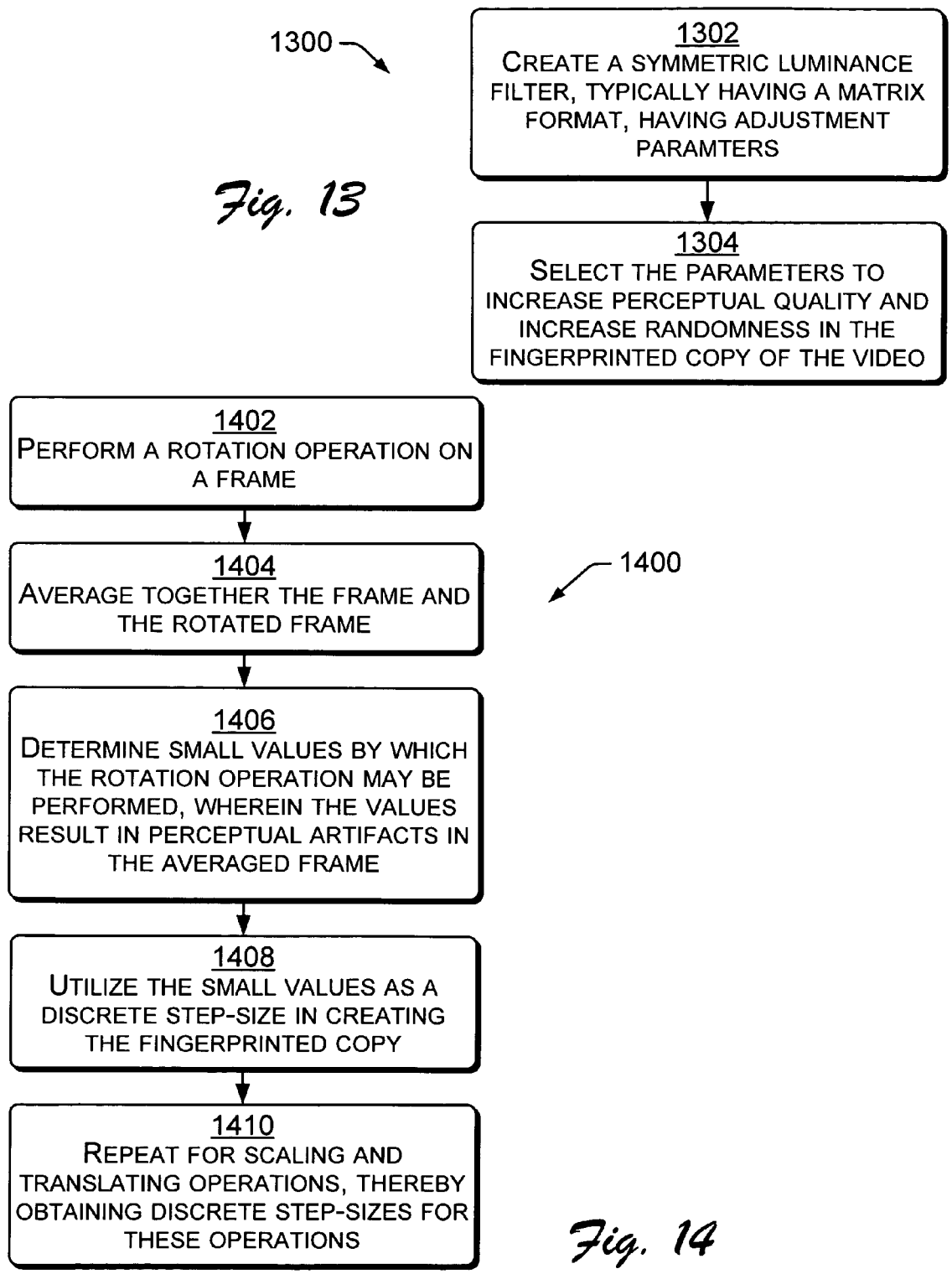
FIG. 13 illustrates exemplary aspects of spatial desynchronization, including luminance-filtering strategies.
FIG. 14 illustrates exemplary aspects of spatial desynchronization, including parameter discretization strategies.

FIG. 13 shows an embodiment 1300 of spatial desynchronization characterized by luminance filtering. At block 1302, a symmetric luminance filter is created. The filter may be of the form of equation (17C), or similar. At block 1304, parameters are selected to increase perceptual quality and increase randomness in the fingerprinted copy of the video. In an embodiment wherein a filter such as equation (17C) is used, the parameters A and B are selected to tune the luminance filter, as desired.

Parameter smoothing and optimization tools are configured to control parameter values and produce differently desynchronized copies of a video. One such tool, 'parameter discretization' helps to provide a sufficiently different value for parameters associated with different copies of a video. As discussed before, the RST parameters are bounded to preserve the perceptual quality. Furthermore, to produce enough difference between two differently desynchronized copies of video, the parameters also need to be discretized (i.e. made discrete) with a big enough step size. To determine the step size appropriate in the discretization, the following experiment may be conducted. In one example, two copies of a 640×480 frame are averaged, wherein the first copy is the original copy, and the second copy is the copy after rotation by $\Delta_\theta$ degrees. Then, the two frames are averaged and observed to determine if there are any perceptual artifacts in the averaged frame, such as blurring. Generally, use the smallest $\Delta_\theta$ value that causes perceptual artifacts as the discrete step-size. Using similar approaches, determine the scaling and translation parameter step-size. For example, choose eight quantization levels for the rotation parameter, eight for translation parameters, and for the scaling parameters. These results are summarized in Table I.

TABLE I

PARAMETER DISCRETIZATION FOR RST OPERATIONS

|  | Rotation | Translation | Scaling |
|---|---|---|---|
| step-size | 0.4 degree | 2 pixels | 0.01 |
| min | −1.4 degrees | −7 pixels | 0.965 |
| max | 1.4 degrees | 7 pixels | 0.995 |
| levels | 8 | 8 | 4 |

FIG. 14 shows an embodiment 1400 of spatial desynchronization characterized by parameter smoothing and optimization. This operation provides a discrete step-size by which spatial desynchronizing operations may be performed. At block 1402, a rotation operation is performed on a frame. At block 1404, the frame and the rotated frame are averaged together. The method by which this averaging is performed is somewhat flexible. At block 1406, small values by which the rotation operation may be performed are determined, wherein the values result in perceptual artifacts in the averaged frame. At block 1408, the small values are utilized as a discrete step-size in creating the fingerprinted copy. At block 1410, blocks 1402-1408 are repeated for scaling and translating operations, thereby obtaining discrete step-sizes for these operations.

Temporal smoothing tools are used to smooth video images of the desynchronized frames. As a 3-D signal, video provides both opportunity and problem for spatial de-synchronization. Since human visual system can retain an image after viewing it for a short time, the standard video frame rate of about 30 frames per second can smooth out the minor distortions in individual frames. As a result, some distortions, which would have caused perceptual artifacts when viewed as still images, would not cause perceptual artifacts when viewed as motion pictures. On the other hand, human eyes are sensitive to temporal and spatial changes in a video sequence.

For example, when a frame is rotated by 0.5 degree and viewed as a still image, usually the rotation will not be noticed. However, if this frame is followed by another frame rotated by −0.5 degrees, such rotations would be clearly noticed because there will be a "jittering" effect.

To achieve temporal smoothness in our scheme, we choose to generate the RST, bending and luminance filtering parameters fields for every other L frames and use linear interpolation to obtain the parameter fields in the intermediate frames. The linear interpolation is chosen to save the parameter update time and the storage required. For example, suppose we generate the rotation parameter r(k) for the k-th frame and r(k+L) for the (k+L)-th frame, The parameter r(i) for k.<i<k+L is $r(i)=(i-k)(r(k+L)-r(k))/L.$ In the above implementation, the parameter L=128, which corresponds to about 4 seconds if the video rate is 30 frames per second.

Figure 15:
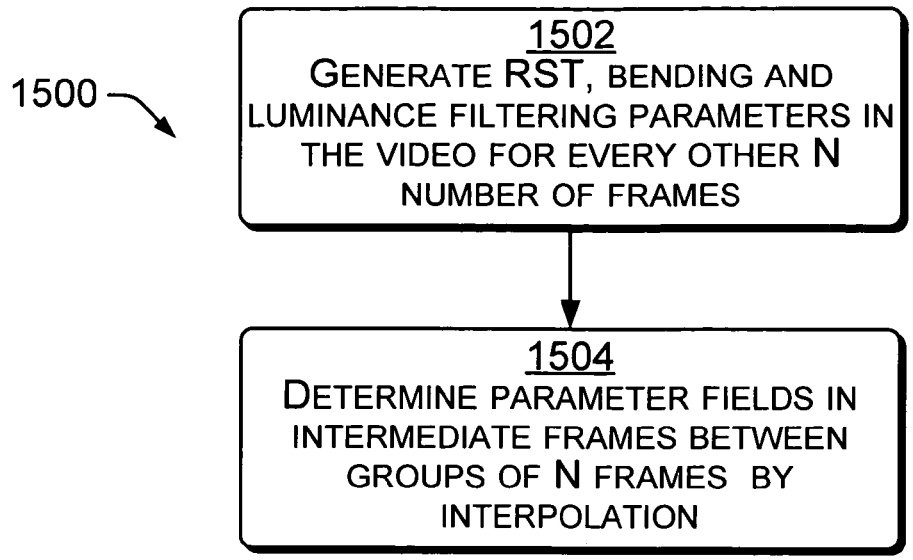
FIG. 15 illustrates exemplary aspects of spatial desynchronization, including temporal smoothing strategies.

FIG. 15 shows an embodiment 1500 of spatial desynchronization characterized by temporal smoothing. At block 1502, RST (rotation, scaling and translation), bending and/or luminance filtering parameters are generated in the video for every other N number of frames. At block 1504, parameter fields in intermediate frames between groups of N frames are determined by interpolation. As a result, temporal smoothness is enhanced, thereby removing some of the jittering effect introduced by the RST, bending and luminance filtering operations.

Parameter distribution tools assist in separating the frames of desynchronized versions of the video. Suppose we have a frame F and two de-synched version of this frame $F_1$ and $F_2$. In order to deter collusion, we would like that the distance between $F_1$ and $F_2$ be as far as possible. One possible distance measure is the pixel-by-pixel difference, i.e., $d(F_1(x, y), F_2(x, y))=|F_1(x, y)-F_2(x, y)|$. Suppose that $F_1$ and $F_2$ are only rotated versions of F, where $F_1$ is rotated by an angle of $\theta_1$ and $F_2$ by $\theta_2$. Consider that a pixel at location (x, y) in frame $F_1$ is from location $(x_1, y_1)$ in frame F, and that pixel (x, y) in frame $F_2$ is frame location $(x_2, y_2)$ in frame $F_1$ i.e.

$F_1(x, y)=F(x_1, y_1)$ and $F_2(x, y)=F(x_2, y_2)$.

According to Eqn. (14) we have $x_1=\cos\theta_1 x - \sin\theta_1 y,$ $y_1=\sin\theta_1 x + \cos\theta_1 y,$ $x_2=\cos\theta_2 x - \sin\theta_2 y,$ and $y_2=\sin\theta_2 x + \cos\theta_2 y.$ We assume that the rotation angle $\theta_1$ and $\theta_2$ are very small, which is true in the case of desynchronization because we want to maintain the content to be about the same. Under this assumption, we have $$\cos\theta_1 \approx 0; \sin\theta_1 \approx \theta_1; \cos\theta_2 \approx 0; \sin\theta_2 \approx \theta_2; \quad (19)$$

The pixel-by-pixel distance between two frames is $$\begin{aligned} dist(F1(x,y), F2(x,y)) &= |F_1(x,y) - F_2(x,y)| \quad (20) \\ &= |F(x_1, y_1) - F(x_2, y_2)| \\ &\approx |F(x-\theta_1 y, y+\theta_1 x) - \\ &\quad F(x-\theta_2 y, y+\theta_2 x)| \end{aligned}$$

We assume that the luminance value of F changes approximately linearly in a small neighborhood of any location (x, y), and user the $L_2$ norm to measure the spatial distance, then the above equation becomes $$\begin{aligned} dist(F_1(x,y), F_2(x,y)) &= \alpha \cdot \|(x-\theta_1 y, y+\theta_1 x), \quad (21) \\ &\quad (x-\theta_2 y, y+\theta_2 x)\| \\ &= \alpha \cdot |\theta_1 - \theta_2| \cdot \sqrt{x^2 + y^2}. \end{aligned}$$

Similar results can be derived for translation, scaling, and bending operations. It is clear under such derivation that if we want to maximize the distance between any two versions of desynchronized frames, we need to maximize the distance between the two rotation parameters. Since the two rotation parameters are i.i.d. random variables taking values from a discrete set $\{-\Theta, -\Theta+\Delta_\theta, -\Theta+2\Delta_\theta, \ldots, \Theta\}$, the problem becomes to find the distribution p for the parameter that maximizes the expected distance between $\theta_1$ and $\theta_2$. We use the L2 norm to measure the distance and formulate the problem as follows $$\max_P E(\theta_1 - \theta_2)^2. \quad (22)$$

The above formulation leads to a distribution that is $Pr(\theta=-\Theta)=Pr(\theta=\Theta)=\frac{1}{2}$.

Such a distribution, although maximized the expected distance between any two rotated copies of a frame, cannot withstand a brute-force attack because the amount of randomness is too small. Therefore, a randomness constraint may be added to the formulation (22), as follows:

$$\max_P E(\theta_1 - \theta_2)^2 \text{ subject to } H(P) \geq h, \quad (23)$$

where H(•) denotes the entropy of a distribution and h is a threshold for the entropy. Since the rotation parameter has been quantized into eight levels, the maximum possible entropy is 3 bits. Choose an entropy threshold h=2.8 bits and solve (23) numerically to obtain the distribution in the first two rows in Table II. We only give the one-sided pmf since the pmf is-symmetric. Note that the distribution is the solution to (23) for all eight-level pmf's. Therefore, it can also be used as the distribution for the translation parameter. For the scaling parameter, since it is quantized into four levels, choose the entropy threshold h=1.9 bits and the corresponding pmf is shown in the last two rows in Table II.

TABLE II

PARAMETER DISTRIBUTION FOR RST OPERATIONS

| | $-\Theta$ | $-\Theta + \Delta_\theta$ | $-\Theta + 2\Delta_\theta$ | $-\Theta + 3\Delta_\theta$ |
|---|---|---|---|---|
| 8 values | | | | |
| (one-sided) pmf | 0.2375 | 0.1219 | 0.0781 | 0.0625 |
| 4 values | | | | |
| pmf | 0.3420 | 0.1580 | 0.1580 | 0.3420 |

Figure 16:
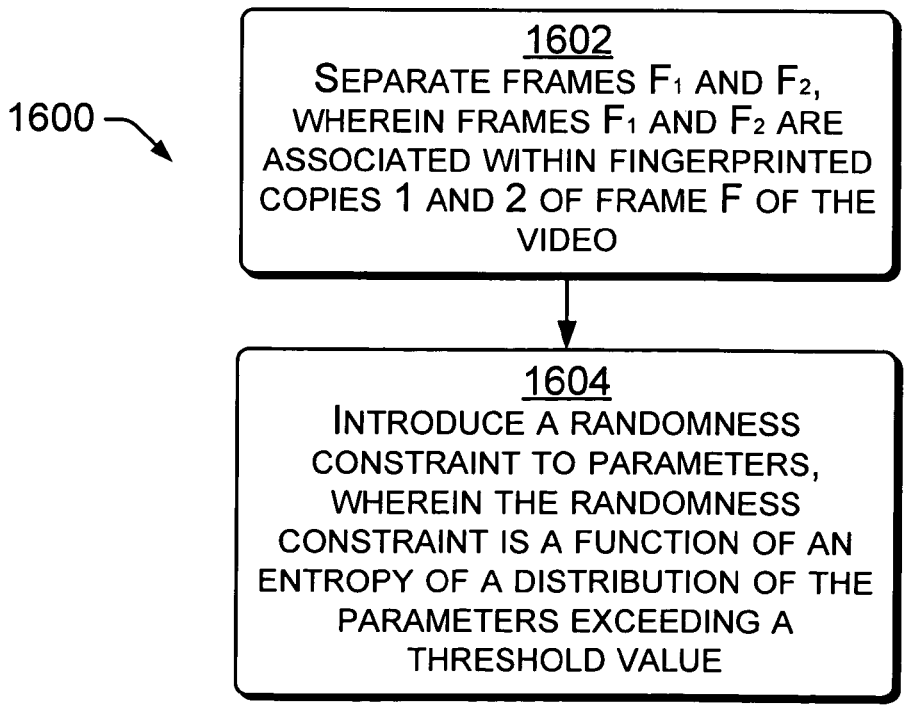
FIG. 16 illustrates exemplary aspects of spatial desynchronization, including parameter distribution strategies.

FIG. 16 shows an embodiment 1600 of spatial desynchronization characterized by parameter distribution tools. Such tools are helpful in increasing the distance between two frames within two fingerprinted copies of a video. At block 1602, frames $F_1$ and $F_2$, are separated, wherein frames $F_1$ and $F_2$ are associated within fingerprinted copies 1 and 2 of frame F of the video. The separation is performed by distancing rotational, scaling, translational and random bending parameters associated with $F_1$ and $F_2$. At block 1604, a randomness constraint is introduced to parameters used in creating $F_1$ and $F_2$, wherein the randomness constraint is a function of entropy of a distribution of the parameters exceeding a threshold value.

Exemplary Computing Environment

Figure 17:
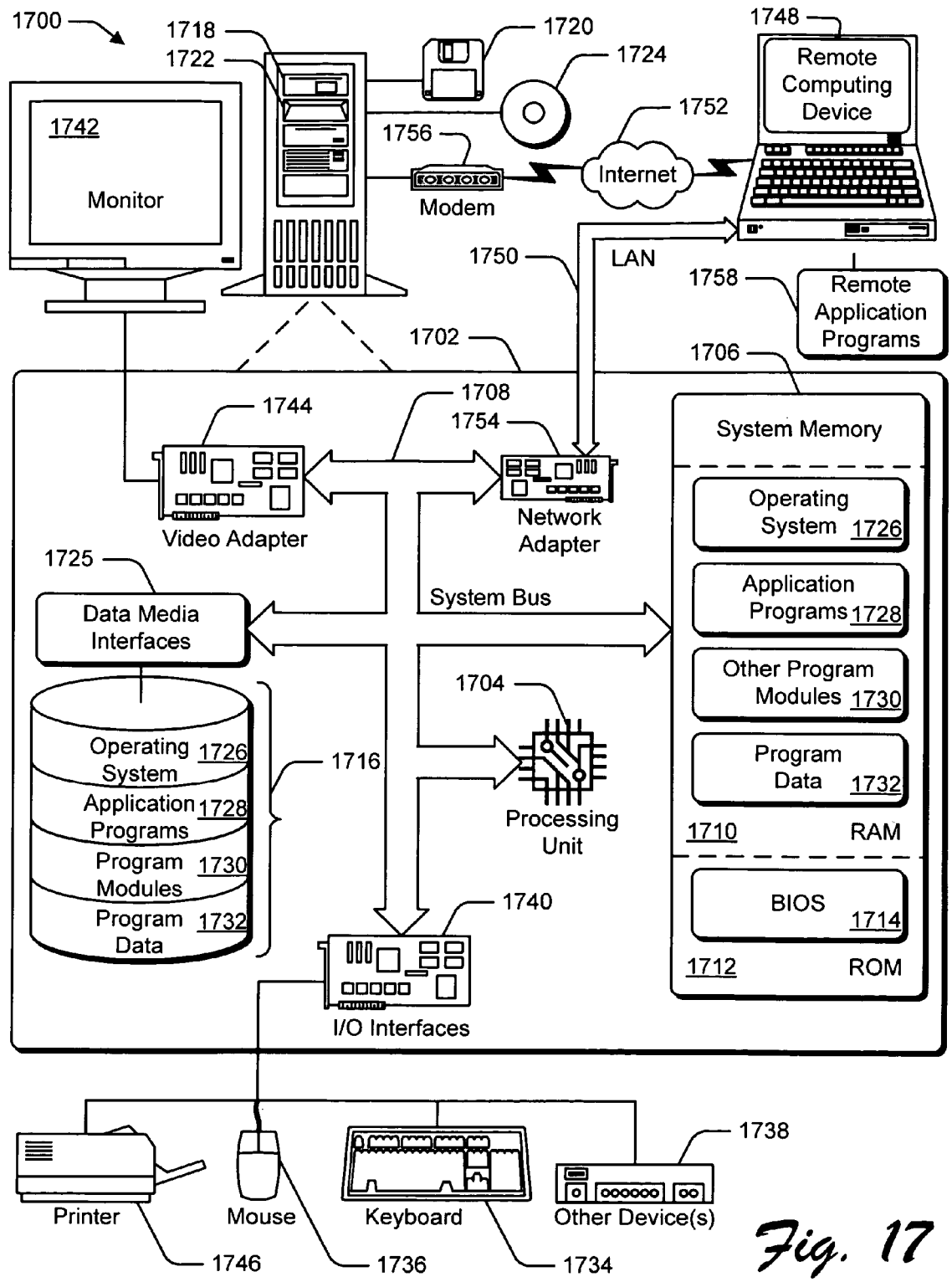
FIG. 17 illustrates an exemplary computing environment suitable for implementing collusion-resistant desynchronization for digital video fingerprinting.

FIG. 17 illustrates an exemplary computing environment suitable for implementing collusion-resistant desynchronization for digital video fingerprinting. The computing environment 1700 includes a general-purpose computing system in the form of a computer 1702. The components of computer 1702 can include, but are not limited to, one or more processors or processing units 1704, a system memory 1706, and a system bus 1708 that couples various system components including the processor 1704 to the system memory 1706. The system bus 1708 represents one or more of any of several types of bus structures, including a memory bus or memory controller, a peripheral bus, a Peripheral Component Interconnect (PCI) bus, an accelerated graphics port, and a processor or local bus using any of a variety of bus architectures.

Computer 1702 typically includes a variety of computer readable media. Such media can be any available media that is accessible by computer 1702 and includes both volatile and non-volatile media, removable and non-removable media. The system memory 1706 includes computer readable media in the form of volatile memory, such as random access memory (RAM) 1710, and/or non-volatile memory, such as read only memory (ROM) 1712. A basic input/output system (BIOS) 1714, containing the basic routines that help to transfer information between elements within computer 1702, such as during start-up, is stored in ROM 1712. RAM 1710 typically contains data and/or program modules that are immediately accessible to and/or presently operated on by the processing unit 1704.

Computer 1702 can also include other removable/non-removable, volatile/non-volatile computer storage media. By way of example, FIG. 17 illustrates a hard disk drive 1716 for reading from and writing to a non-removable, non-volatile magnetic media (not shown), a magnetic disk drive 1718 for reading from and writing to a removable, non-volatile magnetic disk 1720 (e.g., a "floppy disk"), and an optical disk drive 1722 for reading from and/or writing to a removable, non-volatile optical disk 1724 such as a CD-ROM, DVD-ROM, or other optical media. The hard disk drive 1716, magnetic disk drive 1718, and optical disk drive 1722 are each connected to the system bus 1708 by one or more data media interfaces 1725. Alternatively, the hard disk drive 1716, magnetic disk drive 1718, and optical disk drive 1722 can be connected to the system bus 1708 by a SCSI interface (not shown).

The disk drives and their associated computer-readable media provide non-volatile storage of computer readable instructions, data structures, program modules, and other data for computer 1702. Although the example illustrates a hard disk 1716, a removable magnetic disk 1720, and a removable optical disk 1724, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 1716, magnetic disk 1720, optical disk 1724, ROM 1712, and/or RAM 1710, including by way of example, an operating system 1726, one or more application programs 1728, other program modules 1730, and program data 1732. Each of such operating system 1726, one or more application programs 1728, other program modules 1730, and program data 1732 (or some combination thereof) may include an embodiment of a caching scheme for user network access information.

Computer 1702 can include a variety of computer/processor readable media identified as communication media. Communication media typically embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

A user can enter commands and information into computer system 1702 via input devices such as a keyboard 1734 and a pointing device 1736 (e.g., a "mouse"). Other input devices 1738 (not shown specifically) may include a microphone, joystick, game pad, satellite dish, serial port, scanner, and/or the like. These and other input devices are connected to the processing unit 1704 via input/output interfaces 1740 that are coupled to the system bus 1708, but may be connected by other interface and bus structures, such as a parallel port, game port, or a universal serial bus (USB).

A monitor 1742 or other type of display device can also be connected to the system bus 1708 via an interface, such as a video adapter 1744. In addition to the monitor 1742, other output peripheral devices can include components such as speakers (not shown) and a printer 1746 which can be connected to computer 1702 via the input/output interfaces 1740.

Computer 1702 can operate in a networked environment using logical connections to one or more remote computers, such as a remote computing device 1748. By way of example, the remote computing device 1748 can be a personal computer, portable computer, a server, a router, a network computer, a peer device or other common network node, and the like. The remote computing device 1748 is illustrated as a portable computer that can include many or all of the elements and features described herein relative to computer system 1702.

Logical connections between computer 1702 and the remote computer 1748 are depicted as a local area network (LAN) 1750 and a general wide area network (WAN) 1752. Such networking environments are commonplace in offices, enterprise-wide computer networks, intranets, and the Internet. When implemented in a LAN networking environment, the computer 1702 is connected to a local network 1750 via a network interface or adapter 1754. When implemented in a WAN networking environment, the computer 1702 typically includes a modem 1756 or other means for establishing communications over the wide network 1752. The modem 1756, which can be internal or external to computer 1702, can be connected to the system bus 1708 via the input/output interfaces 1740 or other appropriate mechanisms. It is to be appreciated that the illustrated network connections are exemplary and that other means of establishing communication link(s) between the computers 1702 and 1748 can be employed.

In a networked environment, such as that illustrated with computing environment 1700, program modules depicted relative to the computer 1702, or portions thereof, may be stored in a remote memory storage device. By way of example, remote application programs 1758 reside on a memory device of remote computer 1748. For purposes of illustration, application programs and other executable program components, such as the operating system, are illustrated herein as discrete blocks, although it is recognized that such programs and components reside at various times in different storage components of the computer system 1702, and are executed by the data processor(s) of the computer.

CONCLUSION

Exemplary systems and methods for implementing aspects of collusion resistant desynchronization for digital video fingerprinting have been described, in part by reference to the flow diagrams of FIGS. 1-6, 8-10 and 12-16. The elements of the described methods may be performed by any appropriate means including, for example, hardware logic blocks on an ASIC or by the execution of processor-readable instructions defined on a processor-readable medium. A "processor-readable medium," as used herein, can be any means that can contain, store, communicate, propagate, or transport instructions for use by or execution by a processor. A processor-readable medium can be, without limitation, an electronic, magnetic, optical, electromagnetic, infrared, or semiconductor system, apparatus, device, or propagation medium. More specific examples of a processor-readable medium include, among others, an electrical connection having one or more wires, a portable computer diskette, a random access memory (RAM), a read-only memory (ROM), an erasable programmable-read-only memory (EPROM or Flash memory), an optical fiber, a rewritable compact disc (CD-RW), and a portable compact disc read-only memory (CDROM).

Although aspects of this disclosure include language specifically describing structural and/or methodological features of preferred embodiments, it is to be understood that the appended claims are not limited to the specific features or acts described. Rather, the specific features and acts are disclosed only as exemplary implementations, and are representative of more general concepts.

The invention claimed is:

1. One or more computer-readable media comprising computer-executable instructions for video digital fingerprinting, the computer-executable instructions comprising instructions for:
   temporally desynchronizing a video to be protected;
   spatially desynchronizing the video; and
   creating a fingerprinted copy of the video as modified by the temporal and spatial desynchronizations;
   wherein combination of a plurality of fingerprinted copies of the video will result in a colluded video with visible artifacts.

2. The one or more computer-readable media of claim 1, wherein temporally desynchronizing the video comprises applying an affine warping solution, wherein the affine warping solution comprises instructions for:
   deriving an equation describing an affine warping from frame F1 to frame F2 within the video; and
   finding a parameter vector describing the warping by solving a minimization problem derived from the equation.

3. The one or more computer-readable media of claim 1, wherein temporally desynchronizing the video comprises applying an affine warping solution, wherein the affine warping solution comprises instructions for:
   estimating a warping matrix W from F1 to F2;
   computing forward and backward affine matrices;
   obtaining forward and backward warped frames by re-sampling F1 and F2 at warped coordinates; and
   interpolating non-integral coordinates to produce the output value.

4. The one or more computer-readable media of claim 1, wherein temporally desynchronizing the video comprises applying an optical flow solution, wherein the optical flow solution comprises instructions for:
   assuming a constant illumination f to a point (x, y) before and after motion;
   deriving a flow equation, wherein $\nabla f$ is a spatial gradient vector of f; and
   computing a motion vector with which to sample the video using $\nabla f$ and an estimated spatial and temporal gradient of the luminance.

5. The one or more computer-readable media of claim 1, wherein temporally desynchronizing the video comprises applying a motion vector switching solution, wherein the motion vector switching solution comprises instructions for:
   generating a plurality of pairs of warped frames;
   associating a motion vector with each pair of the warped frames, thereby obtaining a plurality of motion vectors;
   applying an error function to each of the motion vectors; and
   using the error function to select a motion vector from among the plurality of motion vectors for use in the temporal desynchronization.

6. The one or more computer-readable media of claim 1, wherein temporally desynchronizing the video comprises applying a motion compensated temporal interpolation solution, wherein the motion compensated temporal interpolation solution comprises instructions for:
   generating G1 and G2 by warping F1 and F2 toward a time instance;
   re-sampling G1 and G2 according as a function of F1 and F2; and
   obtaining the interpolated frame F as a function of G1 and G2.

7. The one or more computer-readable media of claim 1, wherein temporally desynchronizing the video comprises applying a constrained random temporal re-sampling solution, wherein the constrained random temporal re-sampling solution comprises instructions for:
   generating pseudo-random time indices along a temporal axis and re-sample the video at the newly-generated time instances by means of frame interpolation;
   constraining the generation to require at least one frame in the re-sampling between two frame intervals in the original video;
   generating random time increments $\Delta_i$ to be uniformly distributed within $[1-\delta, 1+\delta]$;
   initializing $t(0)=0$ and compute time index $t(i)=t(i-1)+\Delta_i$ for $i=1, 2, \ldots, N$, where N is the re-sampled video's length and is random according to $N \sim \text{Uniform}[M(1-\alpha), M(1+\alpha)]$;
   scaling the values $t(1)$ to $t(N)$ to require all time indices fall within $[0, M]$; and
   choosing $\alpha$ to control length of variation and $\delta$ to control temporal jittering.

8. The one or more computer-readable media of claim 1, wherein temporally desynchronizing the video comprises an interpolation skipping strategy, wherein the interpolation skipping strategy comprises instructions for:
   determining which frames within the video describe fast motion and complex video; and
   skipping the re-sampling of these frames.

9. The one or more computer-readable media of claim 1, wherein spatially desynchronizing the video comprises instructions for:
   rotating, scaling and translating points within the video to be protected.

10. The one or more computer-readable media of claim 1, wherein spatially desynchronizing the video comprises a random bending solution, wherein the random bending solution comprises instructions for:
    generating, using a key, a pseudo-random sampling grid;
    preserving ordering of sampling locations with respect to both rows and columns;
    sampling all regions having an area larger than a threshold;
    generating perturbation vectors periodically for sampled locations; and
    smoothing the perturbation vectors by interpolation.

11. The one or more computer-readable media of claim 1, wherein spatially desynchronizing the video comprises luminance filtering, wherein the luminance filtering comprises instructions for:
    creating a symmetric luminance filter; and
    selecting parameters within the filter to increase perceptual quality and increase randomness in the fingerprinted copy of the video.

12. The one or more computer-readable media of claim 1, wherein spatially desynchronizing the video comprises parameter discretization, wherein the parameter discretization comprises instructions for:
    performing a rotation operation on a frame;
    averaging the frame with the rotated frame;
    determining small values by which the rotation operation may be performed that result in perceptual artifacts in the averaged frame;
    utilizing the small values as a discrete step-size in creating the fingerprinted copy; and
    repeating for scaling and translating operations.

13. The one or more computer-readable media of claim 1, wherein spatially desynchronizing the video comprises instructions for temporal smoothing, wherein the temporal smoothing comprises instructions for:

generating rotation, scaling and translation and luminance filtering parameters used to spatially desynchronize frames in the video for every other N number of frames; and interpolating to obtain parameter fields in intermediate frames between groups of N frames.

14. The one or more computer-readable media of claim 1, wherein spatially desynchronizing the video comprises instructions for parameter distribution, wherein the parameter distribution comprises instructions for:

separating frames F1 and F2, wherein frames F1 and F2 are associated within fingerprinted copies 1 and 2 of frame F of the video, by distancing rotational, scaling, translational and random bending parameters associated with F1 and F2; and introducing a randomness constraint to the parameters, wherein the randomness constraint is a function of an entropy of a distribution of parameters exceeding a threshold value.

15. One or more computer-readable media comprising computer-executable instructions for video digital fingerprinting, the computer-executable instructions comprising instructions for:

applying first and second temporal desynchronizations to a video to be protected;

applying first and second spatial desynchronizations to the video; and creating first and second fingerprinted copies of the video according to the temporal desynchronizations and the spatial desynchronizations;

wherein combination of the first and second fingerprinted copies into a colluded video results in perceptible artifacts.

16. The one or more computer-readable media of claim 15, wherein applying temporal desynchronizations comprises instructions for:

replacing time indices associated with frame sampling of the video with random time indices.

17. The one or more computer-readable media of claim 15, wherein applying spatial desynchronizations comprises instructions for:

global operations applied to a plurality of frames and local operations applied to individual frames.

18. One or more computer-readable media comprising computer-executable instructions for video digital fingerprinting, the computer-executable instructions comprising instructions for:

temporally desynchronizing a video to be protected by using pseudo random time indices;

spatially desynchronizing the video by applying rotation, scaling and translation operations in combination with random bending operations; and creating a fingerprinted copy of the video as modified by the temporal and spatial desynchronizations;

wherein combination of a plurality of copies of the video, each having temporal and spatial desynchronizations, results in a copy of the video with visible artifacts.

19. The one or more computer-readable media of claim 18, wherein the temporal desynchronization comprises instructions for:

applying an affine warping solution to the re-sampling, wherein a parameter vector is used to alter frames within the video.

20. The one or more computer-readable media of claim 18, wherein the spatial desynchronization comprises instructions for:

applying the rotation, scaling and translation operations globally and the random bending operations locally.

* * * * *